United States Patent Office 2,999,834
Patented Sept. 12, 1961

2,999,834
FIBROUS MATERIALS HAVING COATINGS CONTAINING POLYMERIZATION CATALYSTS
Marco Wismer, Richland Township, Allegheny County, and Ronald R. Rabenold, Pittsburgh, Pa., assignors to Pittsburgh Plate Glass Company, Allegheny County, Pa.
No Drawing. Filed July 11, 1958, Ser. No. 747,854
8 Claims. (Cl. 260—40)

This invention relates to catalysts of interpolymerization and it has particular relation to catalysts of interpolymerization of mixtures of (A) soluble and fusible polyesters of dihydric alcohols and alpha-beta ethylenic dicarboxylic acids and (B) liquid monomers containing terminal $>C=CH_2$ groups attached to a negative radical.

It has heretofore been recognized in the art to reinforce with fibrous materials, such as fiber glass, liquid mixtures of interpolymerizable materials, such as (A) polyesters of glycols and alpha-beta ethylenically unsaturated, dicarboxylic acids and (B) liquid monomers containing terminal $>C=CH$ groups attached to negative radicals. After the incorporation of the liquid interpolymerizable material with the fibrous material, the resultant body is cured to a solid resinous state, usually by application of heat.

For purposes of enhancing the rate of cure of the interpolymerizable component, it is customary to incorporate with the latter prior to the addition of the reinforcement, a catalyst which usually is a free radical initiator, such as an organic peroxide or hydroperoxide. This is often accompanied by a promoter or acclerator to coact with the catalyst to gel the mixture or otherwise to speed up the cure.

These techniques were not fully satisfactory, inasmuch as the catalyzed mixtures often tended to gel within a short time and in order to prevent this effect, it was necessary to withhold the catalyst from the mixture until shortly before the curing operation was to be performed. This necessitated an added operation to be performed by the ultimate fabricator and imposed upon him a requirement for added mixing apparatus. Furthermore, when the catalyst was added, the mixture had to be used up immediately or at least within a short time, so that it was impossible to make up batches which were sufficient to run for a substantial period of time without danger of premature gelation or of objectionable changes in the behavior before the material was used up. If for any reason, it became necessary to hold up operations before the catalyzed material was used up, the latter was likely to gel to such degree that it could not be subsequently used and, therefore, was lost.

This invention is based upon the discovery that the catalyst employed in curing polymerizable or interpolymerizable materials can be dissolved in, or dispersed in a vehicle which is a diester of a non-ethylenic dicarboxylic acid and a monohydric alcohol or in a soluble, fusible, linear polyester of such acid and a glycol and can then successfully be applied as discrete coatings upon fibrous reinforcement for said polymerizable or interpolymerizable mixtures. When so incorporated, the catalyst, even though concentrated about the fibers of relatively small specific volume in the material to be catalyzed, acts as a separate catalyst package and still effectively activates all portions of the interpolymerizable materials to cure the same into the desired solid, resinous, state in which the fibers initially carrying the catalyst now perform a useful function as reinforcements imparting high strength to the resinous body. The latter when heated cures substantially uniformly throughout its mass in essentially the same manner and to the same properties as if the catalyst were dispersed therein in the conventional way, as for example, by solution, before addition of the fibrous material.

Numerous important advantages attend the use of this system in the incorporation of catalysts into the uncatalyzed interpolymerizable component to be reinforced. Some of these are as follows:

(A) The catalyst can be applied as a solution or suspension in an appropriate vehicle, which is a diester or polyester as herein disclosed, to a fibrous reinforcement and when so applied, it is often stable for long periods of time, e.g., for weeks or even several months. The user can then purchase his reinforcement and catalyst as a single package so that when he incorporates the reinforcement with the uncatalyzed interpolymerizable mixture, he concurrently and without any added work and without the use of additional apparatus incorporates the catalyst;

(B) This method substantially obviates the possibility of error in the amount of catalyst incorporated;

(C) The incorporation of the catalyst and the reinforcement may be effected by subjecting a fibrous body containing the catalyst as discrete coatings upon the fibers to agitation with the uncatalyzed mixture or approximately by rolling or pressing the fibers as a body into said mixture;

(D) In still another system, the fibers having catalyst-carrying discrete coatings carrying peroxidic catalysts can be supplied as rovings which at the time of use, are chopped to appropriate lengths and the sections thereof are appropriately deposited as for example by an air stream or blast and concurrently a polyester monomer mixture, may and usually does contain a promotor or accelerator, is sprayed thereupon. The fibers are laid down and quickly covered by and embedded in a continuous phase matrix of interpolymerizable material which is very quickly cured to a solid resinous state. This system is well adapted for, but is not limited to application to backings, as for instance, in forming or repairing boat hulls or other structures which cannot conveniently be baked to cure the resin and which, therefore, it is desirable to cure at room temperature;

(E) The catalyst and the polymerizable or interpolymerizable materials can be kept as separate packages substantially until the very instant in which it is desired to start the cure. Therefore, there is no problem of tank life or of premature gelation or other changes in the mass which may occur after catalysis, when the catalyst is introduced in the conventional manner;

(F) It becomes possible to pre-heat the uncatalyzed components of the interpolymerizable material to any desired degree up to the temperature of normal cure or even somewhat above, so long as the temperature is not so high as to induce objectionable changes, such as excessive evaporation of monomer or charring, or decomposition in the mass. Naturally, too high a temperature, especially, if long continued, may induce gelation even in the absence of catalyst and should be avoided.

Some advantages of pre-heating the mixture reside in substantial reduction in the warm-up time in the curing operation and in lower viscosity, or even elimination of the step of application of heat in the mold or other curing apparatus, the exothermal rise which often attends curing of polymerizable or interpolymerizable mixtures, being relied upon to maintain curing temperature for a sufficient time to obtain hardening of the liquid polymerizable or interpolymerizable material.

It also becomes more practicable to use powerful synergists or promoters, such as amines, or driers, such as naphthenates of cobalt, or quaternary ammonium salts as are disclosed in Parker Patent 2,740,765, or thioglycollic acid etc. to cure the interpolymerizable material in forming the reinforced laminates. These systems produce very rapid gelation of the interpolymerizable material and have heretofore been regarded as not being well suited for use where it is desirable to make up batches of a quantity admitting of extended runs without making up fresh batches.

(G) In the manufacture of reinforced sheets or other bodies, where a matrix-forming interpolymerizable mixture is applied to a mat or web of reinforcement fibers, and where the catalyst is carried as a separate package in the non-reactive coatings upon the reinforcement, it is possible to make up large batches of interpolymerizable material and use them up without fear of premature gelation. Operation can also be halted at any time during the use of the batch and the unused polymerizable or interpolymerizable material can be allowed to stand for extended periods of time, yet when operations are resumed, the material is still perfectly useful in the process.

The following are a few criteria which may be employed in selecting an ester vehicle which may be used as mediums for bonding a catalyst to reinforcements for interpolymer resins:

The diesters or polyesters should be linear and non-ethylenic and should be liquid, or should be solid, susceptible of being rendered liquid by a suitable solvent, or by fusion through application of heat. They should not be so fluid as to drain off the fibers.

They should not tend to react in the presence of the catalyst to form hard impermeable resins.

It appears that they should have some degree of compatibility or solubility in the interpolymerizable material or a component thereof in order to facilitate the liberation of the catalyst contained therein.

It is often desirable that they have good wettability for and adhesion to the reinforcement fibers and to the polymerized matrix material in which the reinforcement is embedded.

The vehicle plastic and the catalyst should be compatible with or dispersible in each other.

Other properties may sometimes be desirable in a diester or polyester used as a carrier for the catalyst. However, these are not universally required and usually, are recognizable in the light of the particular application involved.

The catalyst-carrier esters comprise a non-ethylenic carboxylic acid component and a monohydric alcohol or a glycol. The esters are represented by polyesters of dicarboxylic acids such as:

Aromatic dicarboxylic acids, e.g.:
    Phthalic acid
    Terephthalic acid
    Isophthalic acid Aliphatic dicarboxylic acids, e.g.:
    Succinic acid
    Adipic acid
    Azelaic acid
    Sebacic acid The alcohol components comprise:
Glycols, e.g.:
    Ethylene glycol
    Diethylene glycol
    Triethylene glycol
    Propylene glycol
    Dipropylene glycol
    Butylene glycol Monohydric alcohols forming diesters with aromatic dicarboxylic acids, said diesters being suitable for use as catalyst carriers and being represented by:

Methyl alcohol
    Ethyl alcohol
    Propyl alcohol
    Butyl alcohol
    Hexyl alcohol
    Octyl alcohol
    Lauryl alcohol The various possible commutations and permutations of each of the dicarboxyl acids and the glycol or monohydric alcohol are contemplated. Illustrative examples of the components of polyesters are:

| Dicarboxylic acid: | Glycol |
|---|---|
| Phthalic acid | Diethylene |
| Phthalic acid | Propylene |
| Adipic acid | Propylene |
| Adipic acid | Diethylene |

Any two or more of the acids may be mixed in substantially any proportions. The same is true of the glycols.

Diesters which may be used as binders are represented by:

Dimethyl phthalate
    Dibutyl phthalate
    Dihexyl phthalate

Conventional coating alkyd resins which are soluble in xylene and such-like solvents and which are formed by esterification reaction of a polyol, such as glycerol, pentaerythritol or the like with an approximately stoichiometric amount of a mixture of approximately equal moles of phthalic acid and fatty acid, such as linseed oil fatty acids, castor oil fatty acids, cocoanut oil fatty acids, and the like may also be used. The alkyd of phthalic acid, glycerol and cocoanut oil acids is especially emphasized.

Appropriate catalysts which may be incorporated into the plastic vehicle and applied as discrete coatings to reinforcement fibers, preferably are of the free radical initiator type, such as are employed in curing the interpolymerizable mixtures by conventional methods. They include peroxides, such as:

Benzoyl peroxide
    Acetylbenzoyl peroxide
    Methylethylketone peroxide
    Lauroyl peroxide
    Dibenzal diperoxide
    Di-t-butyl peroxide;
Hydroperoxide, such as:
    Cumene hydroperoxide
    t-Butyl hydroperoxide;
Per acids, such as:
    Peracetic acid
    Perbenzoic acid,
and others.

The catalysts are preferably incorporated into the plastic vehicle employed to coat the fibers in an amount of about 1 to about 60 percent by weight based upon the catalyst-plastic mixture, dependent upon the amount of reinforcement it is desired to incorporate into the article to be manufactured and also the amount of catalyst required to obtain a desired speed of cure in the uncatalyzed interpolymerizable mixture, and other factors which local conditions may impose.

In addition to the free-radical initiator type catalyst, promoters designed to expedite quick gelation of the polymerizable or interpolymerizable mixtures may also be included. Such promoters are represented by soluble salts of siccative metals, e.g. of cobalt, nickel or lead and being represented by cobalt oleate or cobalt naphthenate. Still other promoters comprise thioglycollic acid, amines and others. These promoters often permit the uncatalyzed interpolymerizable phase of the reinforced bodies to be cured at low temperatures, even at room temperature.

Other gelation-promoting catalysts comprise halide salts of quaternary ammonium compounds, e.g., trimethylbenzyl ammonium chloride, may be added in appropriate amount, for example, of about 0.1 to about 20 percent by weight based upon the vehicular solids content of the carrier plastic. The use of these salts as promoters of gelation in interpolymerizable mixtures of:

(A) Polyesters of alpha-beta ethylenic dicarboxylic acids, and;

(B) $>C=CH_2$ monomers, is disclosed in Parker Patent 2,740,765 and reference may be had to the latter for a more complete understanding of the use of such gelation catalyst in combination with the free radical initiator-type catalyst.

The promoters, usually function in combination with the peroxidic catalyst to give rapid gelation and cure and are not fully effective by themselves.

The promoters may be mixed in with the peroxidic catalyst in the ester coatings upon the fibers. However, it is usually preferred to dissolve the promoter in the interpolymerizable mixture of $>C=CH_2$ monomer and the polyester of the alpha-beta ethylenic dicarboxylic acid and a glycol. The mixtures containing polyester without peroxidic catalyst are relatively stable. However, when they are properly incorporated with fibers coated with carrier resin containing a peroxidic catalyst, the catalyst and its promoter become effective as a system relatively quickly to cure the interpolymerizable mixture to a hard, durable, resinous state.

In some instances, it is permissible to mix the interpolymerizable mixture of monomer and the unsaturated polyester with the peroxidic catalyst and to apply the promoter to the fibers. When the fibers carrying the promoter are introduced into the mixture, the catalyst becomes fully active and rapid cure takes place. In this system the pot life of the catalyzed mixture is short but is sufficient if the mixture can be used up at once.

The reinforcements which are employed as carriers for the catalyst-containing vehicles, are represented by fiber glass which has a capacity for imparting great strength to many interpolymer resins.

Other materials which in fiber form, are contemplated as carriers for the catalysts, include such synthetic plastics as nylon, orlon, polyvinyl chloride and other fiber-forming materials. Still other fibers are represented by mineral wool, rock wool, asbestos and the like. However, glass fibers, because of their great tensile strength and general utility, are presently preferred.

Fibers, such as glass fibers, may comprise discrete uniformly distributed monofilaments, or several such filaments may be grouped in one or more loose bundles or strands termed roving, or they may be twisted into yarns or threads. Conventionally, in spinning glass fibers, they are giving sizing coatings of various agents which facilitate the various manipulations; such coatings include binders represented by starch or vinyl acetate, lubricants represented by various non-volatile wetting agents and coupling agents, such as polysilicates or compounds which are complexes of chromium and being known as Werner solutions. These sizing coatings may be distinct from and in addition to the coatings of the present invention.

The coatings containing catalysts of interpolymerization as disclosed herein, may be applied as discrete coatings over the conventional sizing coatings. The two types of coatings do not interfere to any substantial degree with one another and in fact they may even be mutually helpful. If preferred, however, all or part of the sizing coatings may be removed from the fibers by a preliminary burning operation, as is well understood in the art, before the coatings containing the catalysts are applied. Such burning operation is often conducted in the treatment of fibers and threads of glass employed in woven glass fabrics.

As already stated, fiber glass may be employed in the form of foraminous mats or bats of fibers. One such type of binder for mats and preforms are disclosed in an application to John R. Guenther, Serial No. 318,870, filed November 5, 1952. The application discloses the use of a water dispersion of a polyester-monomer mixture to give cohesion to the mat. In this material, water dispersibility is attained by cooking into a polyester of a dicarboxylic acid, such as maleic acid or fumaric acid and a glycol, such as diethylene glycol, a polyethylene glycol. The latter is a polymer of ethylene glycol of high molecular weight (usually of about 600 or 1,000 to about 4,000). The resultant polyester is incorporated with a monomer containing a $>C=CH_2$ group attached to a negative radical and being usually a liquid material. Examples of such monomers are styrene and diallylphthalate. The resultant resin is dispersible in water and the dispersion is sprayed on a mat of fibers and baked to drive off water and cure the resin, and thus to bond the fibers together at points of intersection so that the mat can be handled and subsequently treated. The open, foraminous character of the mat, however, is retained.

Many other techniques for forming highly foraminous mats of glass fibers or similar fibers are recognized in the art; illustrative examples comprise such patents as Morrison et al. 2,662,044 and many others.

These open, foraminous mats can be sprayed with, or dipped in a melt, solution or a suspension of an impregnant diether or polyester vehicle containing free radical initiator catalyst as herein disclosed to provide discrete coatings for the fibers. The resultant mat can be dried to drive off volatile liquids, such as solvents employed to impart fluidity to the vehicle-catalyst mixture. The drying operation is best conducted at moderate temperatures, even room temperature, in order to avoid decomposition of catalyst.

Impregnant material such as a diester or polyester carrying the catalyst may be applied as discrete coatings to the fibers, for example, by use of the techniques of Gorski Patent 2,550,465. The amount of impregnant is then adjusted to introduce an adequate amount of catalyst in the discrete fiber coatings of the mat.

The resultant coherent mat can be filled with uncatalyzed, interpolymerizable mixture of polyester of an alpha-beta ethylenic dicarboxylic acid and $>C=CH_2$ monomer by spreading the same with a blade. It can also be filled by pouring liquid mixture onto the mat and then pressing or rolling it into the interstices of the latter.

When the resultant bodies of catalyst-coated fibers and uncatalyzed but interpolymerizable material are subjected to heat, the interpolymerizable material is activated by the catalyst contained in the discrete coatings on the fibers and is cured to a solid, continuous-phase matrix filling the voids between the fibers.

It is also contemplated to obtain discrete coatings upon the fibers, or certain units comprising the fibers, by application of the coating material containing the catalyst to a roving comprising the fibers or bundles of the fibers. In this operation the fibers may be sprayed with the coating material or may otherwise be contacted therewith to obtain adequate coating. After the solvents (if any) are evaporated from the fibers, the latter in groups or strands or in spun yarn or as monofilaments, can be introduced into a matrix of polymerizable or interpolymerizable material containing little or no catalyst and cured to form rods, sheets or other shapes, the curing reaction being promoted by the influence of the catalyst introduced by the coatings on the fibers.

Glass roving coated with plastic containing available catalysts can also be chopped into units of any desired length and mixed by agitation or kneading with a liquid polymerizable or interpolymerizable material containing little or no available catalyst. The resultant mixture becomes effectively catalyzed substantially throughout its thickness and can be cured to a hard, durable state by baking, much as if catalyst were incorporated in the conventional manner.

The reinforcement material may also be woven into a fabric or mesh, in which instance, the threads and even the fibers therein with or without the original size may be provided with coatings of plastic-containing catalyst in active, free state.

The solution of plastic and catalyst may be applied to fibers or threads either before or after such weaving operation. If applied to woven fabric, the application should be so made that the uncatalyzed but polymerizable or interpolymerizable material can pass freely between and about the fibers and threads to obtain an adequate degree of distribution of the plastic-containing catalyst, thus to assure that the polymerizable or interpolymerizable mixture ultimately to be applied, will be adequately catalyzed throughout its thickness.

In forming reinforced resin bodies, it is permissible to use single thicknesses or meshes of cloth of fiber glass or similar materials. Such single thickness should be impregnated as uniformly as possible by the interpolymerizable resin so that all portions of the latter will be activated by the catalyst upon the fibers forming the cloth. Obviously, any number (2 or more) plys of fabric formed of fibers or threads having individual coatings of plastic-containing catalyst, may be laid up before or after impregnation with the uncatalyzed but interpolymerizable material. The sandwich may be cured, for example, by application of heat to provide useful laminates.

The invention has been found to be particularly useful in connection with certain interpolymerizable mixtures of liquid monomers containing $>C=CH_2$ groups and polyesters of glycols and a dicarboxylic acid component at least a part of which is of an alpha-beta ethylenically unsaturated dicarboxylic acid. Many such mixtures as recognized in the prior art and are illustrated in such patents as: Earl E. Parker 2,593,787, Earl E. Parker 2,676,947.

The first illustrates interpolymerizable mixtures of polyesters and monomers which are stabilized for storage purposes with quaternary ammonium salts. The second illustrates the use of small amounts of, 3 isopropyl catechol to inhibit premature gelation. Other inhibitors could be used in like capacity.

These patents illustrate the direct addition of the peroxidic catalyst to the interpolymerizable mixture, the mixtures for storage purposes, being kept free of such catalysts until or shortly before they are to be cured.

Many liquid monomers containing $>C=CH_2$ groups attached to negative radicals have heretobefore been recognized as being useful for interpolymerization with polyesters of alpha-beta ethylenic dicarboxylic acids. The following are representative examples of such monomers containing terminal $>C=CH_2$ groups.

TABLE A

Hydrocarbons, such as:

Styrene
    Alpha methyl styrene
    Vinyl toluene

Monoesters, such as:

Methyl acrylate
    Methylmethacrylate
    Vinyl acrylate

Diesters, such as:

Diallyl phthalate
    Diallyladipate

Nitriles, such as:

Acrylonitrile

Vinyl halides, such as:

Vinyl chloride
    Vinylidene chloride

Amides, such as:

Acrylamide
    Tetrallyladipamide

In the interpolymerizable mixtures of the patents, the monomeric components, such as styrene, is often spoken of as being a reactive diluent for the polyester component. When mixtures containing such reactive diluents are employed with the reinforcement fibers having coatings containing catalysts as herein disclosed, it appears that the monomer may act as a solvent or partial solvent for the coatings upon the fibers and perhaps also for the catalysts themselves. This solvent action appears to be helpful in obtaining adequate dispersion of the catalyst in the interpolymerizable material.

Some typical polyesters of polyols, e.g., glycols, and dicarboxylic components containing at least a part of dicarboxylic acids which is alpha-beta ethylenically unsaturated and which may be combined with the monomers to provide interpolymerizable mixtures are as follows:

*Example A*

The polyester of this example comprises approximately equal moles of maleic acid and phthalic acid in the dicarboxylic acid component. The two acids are reacted in well known manner, with equivalent amounts of propylene glycol to provide a polyester chain with ethylenic groups dispersed along the length thereof. This polyester is stabilized with a mixture of trimethylbenzyl ammonium chloride and quinone and is mixed with styrene as a monomer. The mixture is of the composition:

|  | Parts by weight |
|---|---|
| Polyester | 2 |
| Styrene | 1 |
| Trimethylbenzylammonium chloride (based upon the mixture) | 0.1% |
| Quinone (based upon the mixture) | 0.001% |

This mixture, in the absence of catalysts, is stable and can be kept for a long period of time. It is suitable for incorporation without catalysts with glass fibers having discrete coatings of plastic containing catalysts which are free radical initiators. When bodies so formed are heated, the mixture of polyester and monomer cures to hard, thermoset state.

*Example B*

The polyester of this example is the same as that of Example A. To this polyester is added 0.02 percent of hydroquinone which is cooked into the polyester to impart storage stability. This polyester in an amount of 2 parts by weight, is incorporated with 1 part by weight of styrene to provide a useful interpolymerizable mixture which can be catalyzed with fibers of glass having discrete coatings of plastic containing a catalyst of interpolymerization.

*Example C*

The polyester of this example comprises as its dicarboxylic acids component 9 moles of maleic acid and 11 moles of phthalic acid, these being reacted with an approximately equivalent amount of propylene glycol. Sixty parts by weight of this polyester are mixed with 25 parts by weight of styrene. Approximately 8520 pounds of this mixture are stabilized with approximately 0.94 pound of 3 isopropyl catechol. This mixture can be catalyzed by addition of glass fibers having discrete coatings of non-thermosetting diesters or polyesters containing catalysts to provide a catalyst package.

Example D

The polyester in this example comprises 1 mole of maleic acid and 6 moles of phthalic acid esterified with an approximately equivalent amount of diethylene glycol to provide a polyester. This polyester appropriately stabilized with a phenolic inhibitor or a tertiary ammonium salt is mixed with styrene to provide an interpolymerizable mixture which is 34 percent styrene and 64 percent polyester. This mixture can be catalyzed with a free radical initiator dispersed in discrete coatings of non-thermosetting ester or polyester upon glass fibers in accordance with the provisions of the present invention.

Example E

The polyester of this example comprises maleic anhydride and dipropylene glycol in equimolar amounts. The polyester is stabilized with 0.01125 percent by weight based upon the total mixture of 3-isopropyl catechol and 0.02 percent upon a like basis of oxalic acid. The polyester is blended with 25 percent based upon the total mixture of styrene. The resultant interpolymerizable mixture can be catalyzed with a catalyst package of glass fibers having discrete coatings of a free radical initiator type catalyst.

In the foregoing Examples A through E, the maleic acid can be replaced by equivalent amounts of fumaric acid or itaconic acid. Phthalic acid may be replaced by a molecular equivalency of teraphthalic or isophthalic acid. Also, it can be replaced by a molecular equivalency of aliphatic dicarboxylic acid, such as adipic acid, azelaic acid, sebacic acid or the like.

It is to be understood the term "dicarboxylic acid" includes the anhydrides of such acids (where they exist) because the resultant polyesters correspond to the polyesters of the dicarboxylic acids per se. The anhydrides often are preferred to the free acids because they react more readily and evolve less water in the reaction.

In general in preparing the polyesters used in preparing the interpolymerizable mixtures, in the Examples A through E, many glycols may be employed. These comprise the propylene glycol, dipropylene glycol and diethylene glycol already mentioned as well as such glycols as trimethylene glycol, triethylene glycol, butylene glycol, and others.

The styrene specifically mentioned may be replaced by other of the monomers, such as any of those heretofore mentioned in Table A.

The percentage of monomer in the mixture of polyester and monomer may fall approximately within a range of about 5 to 60 percent based upon the interpolymerizable components.

In the mixing of the polymerizable or interpolymerizable mixtures with fiber glass or other fibers containing catalysts in discrete coatings, due regard should be given to the incorporation of the coated fibers into the interpolymerizable mixture in an amount to obtain an adequate degree of activity in the interpolymerizable mixture. It is considered that the amounts of catalysts incorporated into the interpolymerizable mixture by way of the fiber reinforcement should fall approximately within a range of 0.1 to about 5 percent based upon the interpolymerizable components. The amount of fibers so incorporated will, of course, depend upon the concentration of catalyst in the non-ethylenic ester and the amount of such ester distributed as coatings upon the fibers. By proper proportioning of the catalyst in the coating material and the amount of such material as applied in the coatings, it is quite easy to obtain concurrently any desired amount of reinforcement material in the interpolymerizable mixture along with the predetermined amount of catalyst for obtaining optimum and most economical curing properties in said mixture.

It is considered that the amount of catalyzed non-thermosetting resin in the discrete coatings containing the catalyst will usually fall within a range of about 0.025 to 20 parts per part of glass fibers.

In most commercial reinforced bodies comprising interpolymerized monomers and polyesters, the amount of glass may run somewhere between about 10 and about 70 percent by weight of the body. This places a practical limit upon the amount of the non-ethylenic ester coatings that can be applied. In those instances in which the fibers are employed primarily for their carrier effect for the catalyst, very high percentages of non-ethylenic binder esters, for example, up to 20 parts or more per part of glass may be employed. This may be charged with 1 to 60 percent of catalyst and enough fibers may be mixed with the interpolymerizable mixture to introduce about 0.05 to 5 percent by weight of catalyst based upon the polymerizable components.

The following are specific examples of ester-catalyst composition which may be used to provide discrete coatings upon glass fibers which are subsequently used to catalyze and to reinforce interpolymerizable compositions in accordance with the provisions of the present invention.

Example I

In this example polyester of propylene glycol and phthalic acid of an acid number of 39 is employed as a plastic material to carry the catalyst. This polyester is dissolved in acetone and a peroxide catalyst which is a mixture of equal parts by weight of benzoyl peroxide and cumene hydroperoxide is added. The resultant catalyzed mixture comprises:

| | Parts by weight |
|---|---|
| Polyester | 40 |
| Acetone | 40 |
| Benzoyl peroxide | 10 |
| Cumene hydroperoxide | 10 |

This mixture is applied, as by spraying, to glass fibers, for example, upon a mat of glass fibers to provide a foraminous body the individual fibers of which have coatings containing the peroxidic catalyst.

In proportioning the amounts of the mixture of catalyst and plastic with respect to the glass fibers and the interpolymerizable mixture with which the mat is ultimately to be incorporated, it will be assumed that approximately 30 percent by weight of the ultimate reinforced body will be glass fibers. It will also be assumed that approximately 1 percent by weight, based upon the interpolymerizable mixture, of catalyst will be incorporated. The catalyst constitutes approximately 33 percent of the propylene phthalate-catalyst mixture. Each 100 pounds of fibers and interpolymerizable mixture will require about 0.7 pound of catalyst. The mixture of propylene phthalate and catalyst required to catalyze the interpolymerizable mixture will then be $0.7 \times 3 = 2.1$ pounds. This amount of propylene phthalate-catalyst mixture dissolved in a non-reactive solvent is added to the glass fibers, which in this instance, weigh 30 pounds. Therefore, to the glass fibers are added $$\frac{2.1}{30} \times 100$$

or 7 percent of the mixture of catalyst and propylene phthalate.

In similar manner the amount of propylene phthalate or its equivalent of other non-ethylenic diester or polyester used as a catalyst carrier, can be determined for any given ratio of glass fibers and for any pre-determined amount of catalyst, as based upon interpolymerizable mixture of monomer containing $>C=CH_2$ groups and alpha-beta ethylenic dicarboxylic acid polyester.

The catalyzed mixture of polyester of non-ethylenic dicarboxylic acids and glycol is applied to the glass fibers by any convenient technique, as for example, by spraying upon a mat of said fibers. The fibers may also be wet with the solution of polyester and the catalyst as a preliminary step to the formation of the mat, the solution being used to bond the fibers together at points of intersection to give coherence thereto. For example, it may be used in place of the emulsion binder disclosed in the patent application to Guenther above mentioned.

The solution of plastics upon the mat may be dried by evaporation of the solvent, preferably, at a temperature sufficiently low to obviate any excessive decomposition of the peroxide catalyst contained in the vehicle.

The mat after treatment with the vehicle containing the catalyst, is stable for several months. When it is to be used, it may be introduced into a mold and enough of an interpolymerizable mixture, namely, that of Example B may be poured thereupon, to provide the desired ratio between the binder resin and the glass fiber reinforcement. The mats may then be subjected to pressure and heat simultaneously to cause the liquid interpolymerizable mixture to permeate into the interstices between the coated fibers and to effect hardening of the interpolymerizable mixture through the joint action of the heat and the catalyst contained in the discrete coatings upon the glass fiber reinforcement.

The temperature of curing usually will be within a range of about 75° C. to about 150° C. over a period of about 1 minute to 2 hours.

Samples of the mat containing the mixture of propylene phthalate and the catalysts possess a high degree of stability. When they are aged for a period of more than 6 months, little change in the catalytic activity when introduced into an interpolymerizable mixture, is observed.

*Example II*

In this example a mixture is prepared comprising:

|  | Parts by weight |
|---|---|
| Dimethyl phthalate | 80 |
| Solvent (e.g. acetone) | 20 |
| Benzyl peroxide | 10 |
| Cumene hydroperoxide | 10 |

This mixture is applied by the techniques described in Example I to provide a coherent foraminous mat of glass fibers containing about 0.7 pound of catalyst per 30 pounds of glass fibers.

The mat is dried as in Example I. The catalytic activity of the coatings upon the fibers of this mat is retained with but slight diminution over long periods of time, for example, more than 6 months.

The mat having the catalyzed coatings upon the fibers may be incorporated with interpolymerizable mixtures, namely, the mixture disclosed in Example B and cured in a mold under heat and and pressure as in Example A to provide a body having a hardness of 50–60 upon the Barcol Scale and being of high tensile strength.

*Example III*

In this example loose fibers having the coatings of non-thermosetting resin containing catalyst, as defined in Example I are introduced as by agitation into the polyester-monomer mixture of Example B in an amount to provide approximately 1 percent by weight of the catalyst. The mixture containing fibers uniformly distributed therein is then poured into a mold which is heated to cure the resin to a hard coherent state.

If desired, the ratio of glass to interpolymerizable mixture of monomer and polyester of alpha-beta ethylenic dicarboxylic acid in this example may be in a range of about 10 to about 60 percent. The percentage of catalysts in the mixture of non-ethylenic ester and catalyst is so adjusted as to provide a percentage of catalyst within a range of about 0.1 to about 5 percent in the interpolymerizable mixture.

*Example IV*

In this example a woven fabric of glass fibers is impregnated with a solution in acetone of a polyester of phthalic acid and propylene glycol containing about 50 percent by weight based upon the polyester of catalyst, namely, benzoyl peroxide. The amount of polyester-monomer mixture is so adjusted as to give approximately 1 percent by weight of catalyst based upon the interpolymerizable mixture ultimately to be introduced into the fabric to form the desired laminate product. The glass content in the latter product usually falls in a range of about 50 to 70 percent. This means that the glass fabric will contain approximately 0.5 pound of catalyst per 50 pounds of fibers. Upon this basis 50 pounds of fibers will contain 1.5 pounds of the propylene phthalate polyester or upon the basis of the fibers the catalyst-polyester mixture will constitute 3 percent.

The fabric when properly impregnated with the polyester-catalyst mixture is dried by evaporation of solvents which can be expedited by warming or by blowing the fabric with air. The temperature of drying should not be allowed to rise so high as to decompose the peroxidic catalyst.

The fabric is treated with the mixture of a monomer containing the groups $>C=CH_2$ and a polyester containing an alpha-beta ethylenic group, namely, a mixture as disclosed in Example B. This can be accomplished by spreading the mixture upon the fabric with a blade or by passing the fabric through a bath of the mixture. Any excess of mixture may be removed, for example, by passing the impregnated fabric between rollers or by other means. The interpolymerizable mixture contained in the fabric is then cured by heating, with or without application of extraneous pressure, at a temperature of about 75° C. to about 150° C. until desired hardness is attained. This is accomplished within a period of about 1 minute to about 2 hours dependent upon temperatures and other factors. Obviously, any of the polyesters of Examples A through E or equivalent polyesters may be mixed with any appropriate monomer and employed as the binder resin component in Example I through IV.

Important advantages of the esters of dicarboxylic acids as carriers for the catalyst and/or the promotors as herein disclosed reside in the long permissible storage life of the carrier-coated fibers. These can often be stored for several months, e.g., 6 months or more without appreciable loss of catalytic activity. The fibers after long storage can still be used to catalyze interpolymerizable mixtures.

Many non-reactive resins such as nitrocellulose, when employed as carriers for catalysts, give coated fibers which are effective, for but a few days. Within a week or less the value of the material is seriously impaired.

In the preceding Examples (I through IV) promoters such as cobalt naphthenate or dimethyl aniline or thioglycollic acid may be added or omitted dependent upon the rate of cure desired. Small amounts of an incompatible wax such as paraffin wax may also be included in those instances in which cure is to be effected at atmospheric temperatures and in the presence of air. The wax provides a surface film that prevents contact of the interpolymerizable mixture with air during curing. The use of waxes as a protective medium in interpolymerizable mixtures is disclosed in a commonly owned application to Howard L. Gerhart et al., Serial Number 371,312, filed July 30, 1953.

*Example V*

This example is illustrative of the use of the catalyst-carrier coated fibers in combination with accelerators or promoters, namely cobalt naphthenate and an amine, namely, dimethyl aniline in curing an interpolymerizable mixture of a monomer and an alpha-beta ethylenic dicarboxylic acid.

The polyester is of the composition:

|  | Moles |
|---|---|
| Maleic | 2 |
| Phthalic | 3 |
| Propylene glycol | 4.1 |
| Diethylene glycol | 1.4 |

This polyester is mixed with styrene as a monomer, hydroquinone as a stabilizer paraffin as an incompatible wax designed to cover the surface and thus exclude air, and cobalt naphthenate as a promoter.

The mixture comprises:

|  | Parts by weight |
|---|---|
| Polyester | 130 |
| Styrene | 70 |
| Hydroquinone | 0.026 |
| Paraffin wax | 0.0626 |

The mixture when it is to be cured, is mixed with a catalyst such as 1 percent by weight based upon the mixture of benzoyl peroxide or methylethyl ketone peroxide. The mixture, without promoter is fairly stable.

The promoter, namely, dimethyl aniline, or cobalt naphthenate in amounts of 0.3 percent by weight upon the resinifiable mixture is carried by the glass fibers. Said promoter may be dispersed in a carrier such as styrene or in a polyester resin such as is described in Example I and applied as discrete coatings upon the fibers.

The mat, carrying the promoter is impregnated with the interpolymerizable mixture, for example, by rolling the mat and the mixture upon a cellophane sheet to effect complete permeation; the body is then cured at room temperature.

*Example VI*

The polyester of this example comprises:

|  | Moles |
|---|---|
| Maleic acid | 1 |
| Phthalic acid | 1 |
| Propylene glycol | 2.2 |

The polyester is stabilized in conventional manner with 0.001 percent by weight based upon the polyester of quinone and 0.1 percent by weight based upon the total resinifiable solids of trimethyl benzyl ammonium chloride.

To 2 parts by weight of polyester is added 1 part by weight of monomer, namely, styrene. Promotor in an amount of about 0.3 percent by weight based upon the resin is added to the mixture and may be either cobalt naphthenate or dimethyl aniline.

The mixture is applied to a mat of glass fibers coated catalyst-carrier mixture as in Example I. The amount of fibers is such as to provide about 30 percent by weight of glass reinforcement. And the coatings upon this mat provide about 1 percent by weight based upon the interpolymerizable mixture of catalyst. The mat can be cured by baking the same at about 150° F. to 250° F. for 10 minutes to 3 hours.

The curing behavior is essentially the same as in a resinifiable mixture of monomer and polyester containing the catalyst dispersed therein in conventional manner. The cured bodies are hard, strong and durable.

In Examples V and VI loose fibers of chopped roving having coatings containing either the catalyst or the promoter may be substituted for the mat. These fibers can be stirred into the resin just prior to curing operations.

The fibers in a blast of air and the resinifiable mixture as a spray may also be laid down concurrently as by guns upon a form or backing. The catalyst and promoter will be kept separate as by combining one or the other with the resinifiable mixture while the other is carried upon the fibers.

It is not precluded to apply the catalyst and the promoter as discrete coatings of a mixture in the carrier resin of Example I, to the glass fibers. When these fibers are mixed into the interpolymerizable mixture, rapid cures are obtained, in some instances, at room temperature.

We claim:

1. A method of catalyzing the interpolymerization of mixtures of $C=CH_2$ monomers and polyesters of alpha-beta ethylenic dicarboxylic acids and dihydric alcohols, which comprises incorporating into the mixtures, reinforcing fibrous material said material having discrete coatings upon the fibers of a polyester of a polyol and a dicarboxylic acid which is free of ethylenic unsaturation, said discrete coatings containing a peroxide polymerization catalyst.

2. A method of catalyzing interpolymerization of a mixture of a $>C=CH_2$ monomer and a polyester of a glycol and a dicarboxylic acid component at least a part of which is alpha-beta ethylenically unsaturated, the amount of polyester being sufficient to interpolymerize with the monomer to form a thermoset resin, the remainder being free of unsaturation, which comprises incorporating into the mixture glass fibers having coatings of a soluble polyester of a polyol and a saturated dicarboxylic acid said coating containing a peroxide polymerization catalyst for said mixture in an amount to effect interpolymerization thereof.

3. A method of forming cured interpolymerizable mixtures of $>C=CH_2$ monomers and polyesters of dihydric alcohols and alpha-beta ethlenic dicarboxylic acids, said interpolymerizable mixture being substantially free of peroxide polymerization catalyst, which comprises incorporating into said interpolymerizable mixtures glass fibers having discrete coatings of an ester formed by reaction of an alcohol and a dicarboxylic acid which is free of ethylenic unsaturation, the latter ester containing a peroxide polymerization catalyst, and heating the mixture to a temperature in a range of about 75° C. to 150° C. until a cure is effected.

4. As a new material glass fibers having individual coatings of polyesters formed by reacting a mixture of (A) an acid selected from the group consisting of:

Phthalic acid
Terephthalic acid
Isophthalic acid
Succinic acid
Adipic acid
Azelaic acid
Sebacic acid and (B) an alcohol selected from the group consisting of:

Ethylene glycol
Diethylene glycol
Triethylene glycol
Propylene glycol
Dipropylene glycol
Butylene glycol
Methyl alcohol
Ethyl alcohol
Propyl alcohol
Butyl alcohol
Hexyl alcohol
Octyl alcohol
Lauryl alcohol the coatings having a peroxidic catalyst of interpolymerization mixed therewith, the catalyst being in an amount of about 1 to 60 percent based upon the catalyst-plastic mixture.

5. A method of catalyzing interpolymerizable mixtures of $>C=CH_2$ monomers and polyesters of glycols and alpha-beta ethylenic dicarboxylic acid which comprises incorporating into said interpolymerizable mixtures glass fibers coated as defined in claim 4, in an amount to provide 10 to 70 percent by weight of said fibers in the body.

6. Glass fibers having discrete coatings of a polyester of (A) a dihydric alcohol and (B) a saturated dicarboxylic acid, said coatings containing a peroxide polymerization catalyst of addition reaction of ethylenically unsaturated organic compounds.

7. Reinforcing fibers of inert, non-reactive materials having individual coatings of a polyester of a dihydric alcohol and a saturated dicarboxylic acid, said polyester containing a peroxide polymerization catalyst, said fibers being adapted to be introduced into a mixture of (A) a >C=CH$_2$ monomer and (B) a polyester of (1) an alpha-beta ethylenic dicarboxylic acid and (2) a polyhydric alcohol to catalyze interpolymerization of said mixture.

8. As a new material adapted to catalyze interpolymerization in an interpolymerizable mixture of a >C=CH$_2$ monomer and a polyester of a glycol and an alpha-beta ethylenic dicarboxylic acid; said new material comprising reinforcing fibers having discrete coatings of an ester of a saturated dicarboxylic acid and a polyhydric alcohol, said discrete coatings containing a peroxide polymerization catalyst for said mixture of monomer and polyester.

References Cited in the file of this patent

UNITED STATES PATENTS

| | | |
|---|---|---|
| 2,255,313 | Ellis | Sept. 9, 1941 |
| 2,550,465 | Gorski | Apr. 24, 1951 |
| 2,593,787 | Parker | Apr. 22, 1952 |
| 2,740,765 | Parker | Apr. 3, 1956 |
| 2,856,378 | Lundberg | Oct. 14, 1958 |
| 2,901,455 | Jurras | Aug. 25, 1959 |

UNITED STATES PATENT OFFICE
CERTIFICATE OF CORRECTION

Patent No. 2,999,834 — September 12, 1961

Marco Wismer et al.

It is hereby certified that error appears in the above numbered patent requiring correction and that the said Letters Patent should read as corrected below.

Column 6, line 30, for "diether" read -- diester --; column 10, line 27, for "peroxide" read -- peroxidic --.

Signed and sealed this 2nd day of October 1962.

(SEAL)
Attest:

ERNEST W. SWIDER
Attesting Officer

DAVID L. LADD
Commissioner of Patents